Nov. 9, 1965   J. E. THUROW   3,216,319
THREE COMPONENT VARIABLE FOCAL LENGTH LENS SYSTEM
Filed July 26, 1961   4 Sheets-Sheet 1
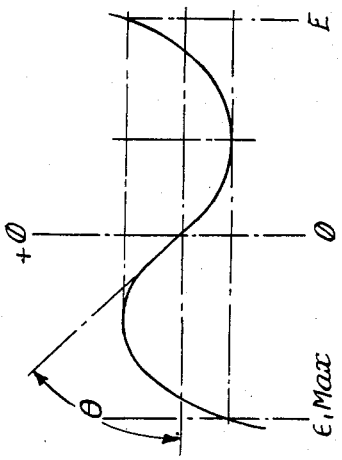
Fig. 4
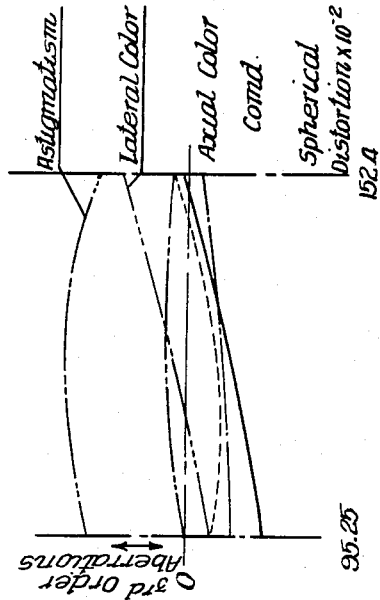
Fig. 9
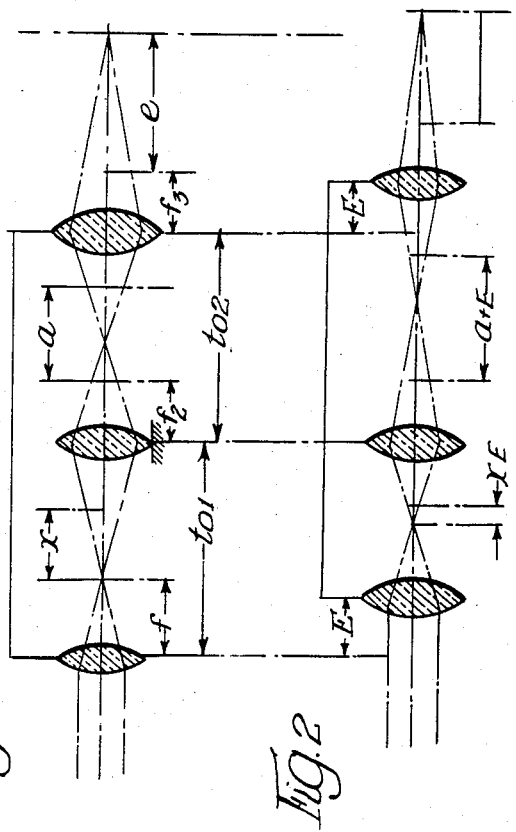
Fig. 1
Fig. 2
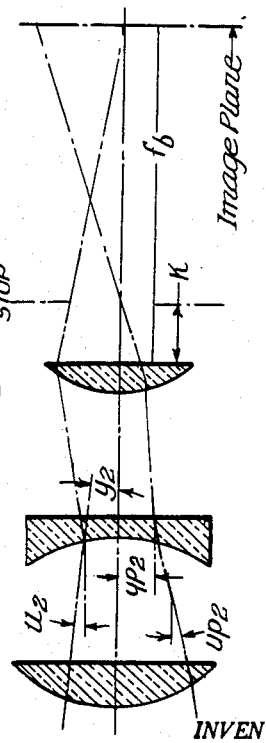
Fig. 3
INVENTOR.
James E. Thurow,
BY

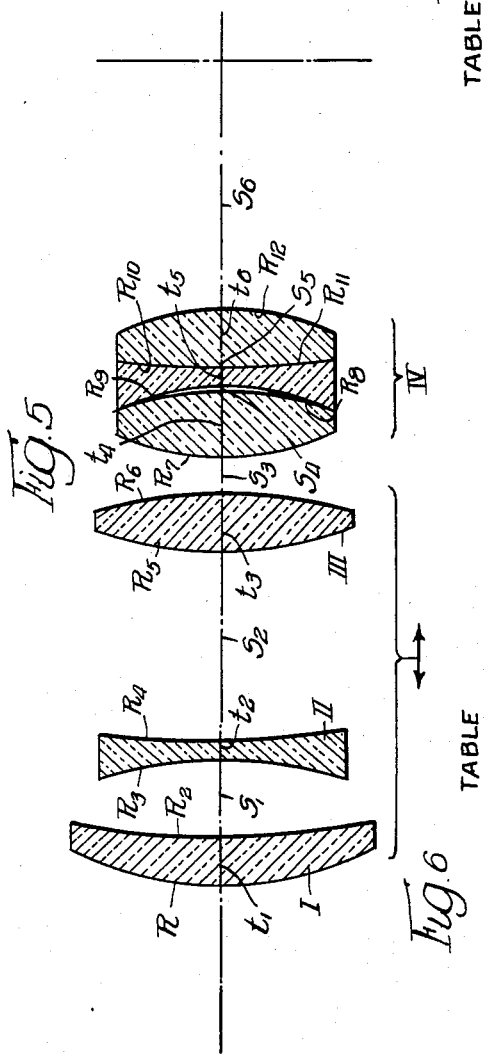

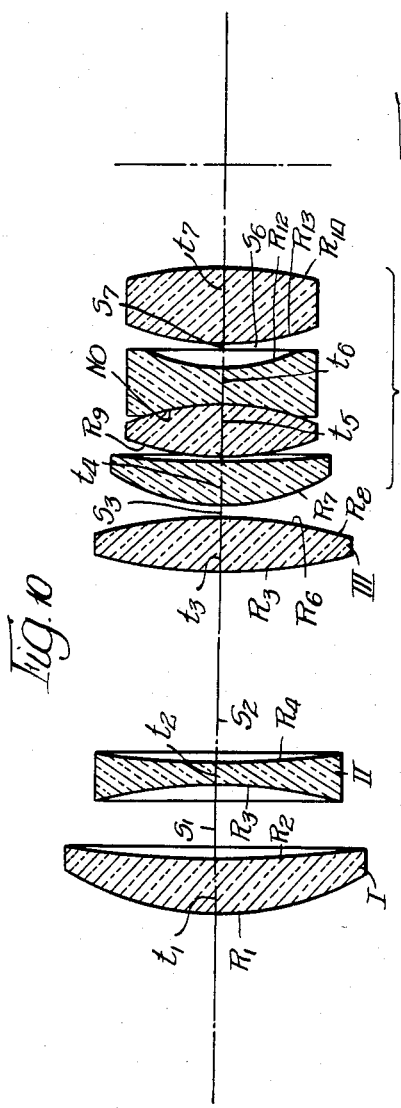

Fig. 15 TABLE

| LENS UNIT | RADII | THICKNESS | SPACES | $N_D$ | $V$ |
|---|---|---|---|---|---|
| I | $R_1 = 19.25$<br>$R_2 = 39.55$ | $t_1 = 2.54$ | $S_1 =$ VARIABLE | 1.517 | 64.5 |
| II | $R_3 = -19.06$<br>$R_4 = 36.13$ | $t_2 = 1.02$ | $S_2 =$ VARIABLE | 1.529 | 51.6 |
| III | $R_5 = 36.63$<br>$R_6 = -30.27$ | $t_3 = 2.54$ | $S_3 =$ VARIABLE | 1.620 | 60.3 |

Fig. 16 TABLE

| LENS UNIT | RADII | THICKNESS | SPACES | $N_D$ | $V$ |
|---|---|---|---|---|---|
| IV | $R_7 = 14.10$<br>$R_8 = -10.60$ | $t_4 = 4.00$ | $S_4 = 0$ | 1.620 | 60.3 |
| | $R_9 = -10.60$<br>$R_{10} = -67.40$ | $t_5 = 6.00$ | $S_5 = 10.834*$ | 1.720 | 29.3 |

\* NOMINAL

Fig. 17 TABLE

| LF | $S_1$ | $S_2$ | $S_3$ |
|---|---|---|---|
| 15 | 5.29 | 10.43 | 3.66 |
| 25 | 14.56 | 1.16 | 12.93 |

INVENTOR.
James E. Thurow,
BY

United States Patent Office 3,216,319
Patented Nov. 9, 1965

3,216,319
THREE COMPONENT VARIABLE FOCAL LENGTH LENS SYSTEM
James E. Thurow, Ann Arbor, Mich., assignor, by mesne assignments, to Argus Incorporated, a corporation of Delaware
Filed July 26, 1961, Ser. No. 126,989
6 Claims. (Cl. 88—57)

This invention pertains to an optically compensated variable focal length system and more specifically, to an improved variable focal length system in which the power of the system is varied by linear motion between lens units with the position of focus remaining substantially constant throughout the variable power range and the aberrations, particularly the change and rate of change of same, are within acceptable limits.

The variable focal length or zoom systems are well known and the prior are regarding the same is quite prevalent. Particularly in the past few years with the advent of television, there has been considerable research devoted to the development of variable focal length systems.

Recently the desire and need has arisen for zoom systems which are particularly suited for use in conjunction with photographic equipment of the type normally purchased and used by non-professional or amateur photographers. The requisites imposed on such systems are minimum of cost, simplicity, compactness, ease of operation, as well as excellence of optical performance. The prior art devices, which have been designed for use with television systems are generally quite costly as well as complicated. For this reason the prior art systems are generally unsuitable for use as photographic equipment of the type purchased and used by amateur photographers.

For the above reasons I have invented an optically compensated system especially suited for use in amateur photographic equipment in which two coupled lens units are moved with respect to an intermediate third unit to obtain the zoom effect. In this system there is a minimum of deviation of back focal length between points of full compensation throughout the zoom range so that it is essentially constant. Furthermore, as a result of the invention the zoom system has a high speed or low $f$ number with a minimum of lens elements.

In view of the foregoing a foremost feature and object of the invention resides in the provision of a variable focal length lens system which is well corrected and has a high relative speed or low $f$ number.

Another feature and object of the invention resides in the provision of a variable focal length lens system having an essentially constant back focal length throughout a substantial change in equivalent focal length.

Another object of the invention is to provide a variable focal length optical system that is especially adapted for use as an objective lens assembly in a projector of the type normally purchased by non-professional users.

Another object of this invention is to provide a variable focal length lens assembly which requires a relatively small number of elements and is relatively simple in construction.

A still further feature and object of the invention resides in the provision of a variable focal length lens system which permits a substantial reducton in size and number of elements for a given standard of optical compensation.

A still further feature and object of the invention resides in the provision of a variable focal length lens system which has a minimum of three points of optical compensation.

A still further feature and object of the invention resides in the provision of a variable focal length system in which the residual aberrations in the zoom portion of the system are substantailly constant.

These and other features and objects of the invention will be apparent upon reading of the specification.

In the drawings:

FIGURES 1, 2 and 3 are schematic representations of a lens system for illustrating the parameters used in designing a variable focal length system embodying the invention.

FIGURE 4 is a graphical representation of the deviation of focus of the zoom portion with respect to the displacement of the coupled lens elements relative to a reference point.

FIGURE 5 is a sectional view of a lens system embodying the invention.

FIGURES 6, 7 and 8 are tables of constructional data for the lens elements comprising the lens assembly shown in FIGURE 5.

FIGURE 9 is a graphical representation of the change in aberrations throughout the zoom range.

FIGURE 10 is a modification of the variable focal length lens assembly embodying the invention.

FIGURES 11, 12 and 13 are tables of constructional data for the lens assembly shown in FIGURE 10.

FIGURES 15, 16 and 17 are tables of constructional data for the lens assembly shown in FIGURE 14.

Figure 14:
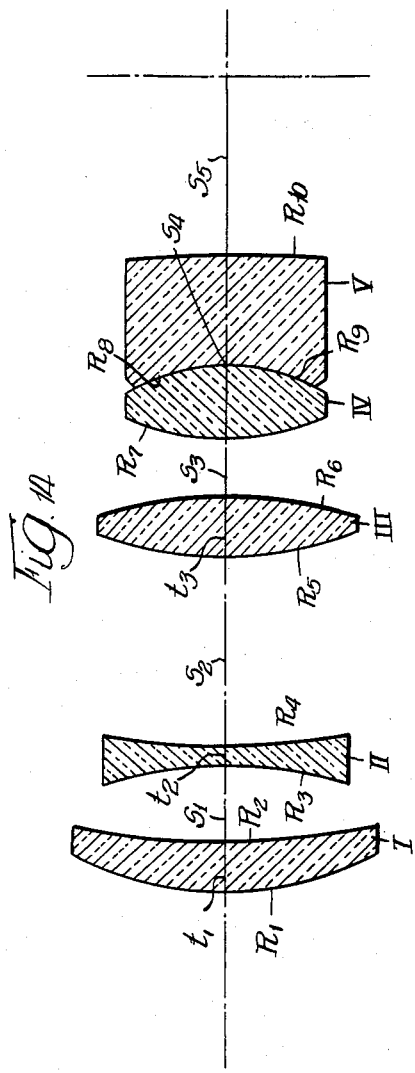
FIGURE 14 is a modified form of the variable focal length lens assembly embodying the invention.

It is to be noted that the variable focal length lens system embodying the invention and disclosed herein is particularly suited for use as the objective lens assembly in projectors. However, this use is merely by way of example and in no manner to be construed as a limitation. As a matter of fact, it is possible to utilize the principles of this invention to construct variable focal length optical systems which may be used in various types of environments. It is also noted that the numerical values set forth herein are not limited to any specific type of units, but are relative values.

Referring now to FIGURES 1 and 2 there is shown a schematic illustration of the system embodying the invention along with the design parameters used in designing the system. Basically, the zoom portion of the system comprises three lens units, which have been generally designated I, II and III. The lens units I and III are rigidly coupled together and are movable with respect to lens unit II. Thus, the distance between lens units I and III remains constant regardless of the position of the system, although the distances between the lens units II and the respective lens units I and III will vary as the system is moved throughout the zoom range.

It is to be understood that the terminology "lens units" refers to one or more lens elements. Moreover, the lens system embodying the invention may comprise either a complete zoom lens or a focal attachment which utilizes motion between lens units for varying the focal length.

As will be seen later on, the lens system may include a fourth lens unit which is to the right of lens unit III and is stationary with respect to lens unit II. The fourth lens unit comprises a relay and accepts and reforms the image formed by the lens unit III for purposes of correcting the aberrational residuals as well as to magnify the image. In some instances the lens unit IV may be omitted. For example, if lens units I, II and III are designed so that the residual aberrations are within acceptable limits and the image formed thereby requires neither magnification or demagnification, then lens unit IV may be omitted.

The parameters shown in FIGURES 1, 2, 3 and 4 and those used in defining the system are as follows:

$\phi$ is the deviation of focus of the lens system as the lens groups are moved;

$e$ is the displacement of lens units I and III from a reference point;

$f_1$, $f_2$, $f_3$, $f_4$ are the effective focal lengths of lens units I, II, III, and IV, respectively;

$a$ is the distance between the secondary focal point of lens unit II and the primary focal point of lens unit III when $e$ equals zero;

$x$ is the distance between the secondary focal point of lens unit I and the primary focal point of lens unit II when $e$ equals zero;

$e_+$ and $e_-$ are values of $e$ when $\phi$ equals zero;

Z is the zoom ratio;

$W_1$ is a factor to take into account the thicknesses of lens units II and III to prevent interference therebetween;

$W_2$ is a factor to take into account the thicknesses of lens units I and II to prevent interference therebetween;

$t_{o1}$ is the distance from the secondary principal plane of lens unit I to the primary principal plane of lens unit II when $e$ is zero;

$t_{o2}$ is the distance from the secondary principal plane of lens unit II to the primary principal plane of lens unit III when $e$ is zero;

$u_i$ is the respective slopes of a paraxial ray before lens units I, II and III ($i$ is symbolic of the specific lens unit);

$y_i$ is the respective principal intercept heights of paraxial ray at lens units I, II, and III ($i$ is symbolic of the specific lens unit);

$u_{pi}$ is the respective slope of a principal ray (a ray that pierces the apertures stop center) before lens units I, II and III ($i$ is symbolic of the specific lens unit);

$y_{pi}$ is the respective principal plane intercept heights of a principal ray at lens units I, II and III ($i$ is symbolic of the specific lens unit);

B is the slope of the deviation of focus curve at the origin.

I have discovered a particular set of formulae for determining the parameters of an optically compensated lens system which includes the three units in which the first and third are rigidly coupled and movable with respect to the second and are:

(1) $\quad a = \dfrac{x(Ax+2)}{(Ax+1)}$ (2) $\quad f_2^2 = \dfrac{x(Ax+1)}{A}$ (3) $\quad f_3^2 = \dfrac{(B-1)(x)}{A(Ax+1)^2}$ Where:

$$A = \frac{(Z-1)}{\sqrt{Z}} \quad B = \frac{-(Ax+1)}{x} \frac{\sqrt{Z}-1}{\sqrt{Z}+1}$$

Where:

$$e_+ - e_- = 1 \quad e_+ = \frac{\sqrt{Z}}{\sqrt{Z}+1}$$

$$\sqrt{Z} > 0 \quad e_- = \frac{-1}{\sqrt{Z}+1}$$

$x$ is chosen so that:

(4) $\quad a + f_2 + f_3 - W_1 \geqq |e_-|$ and $f_1$ is chosen so that:

(5) $\quad x + f_1 + f_2 - W_2 \geqq e_+$

In the above formulae $f_1$, $f_2$, $f_3$, $a$ and $x$ are chosen so as to satisfy the equations and inequalities 1 through 5. Preferred values for $f_2$, $f_3$, $x-e$, and $a+e$ are as follows:

$x - e = -1.643$ to $-1.285$
$f_2 = -1.000$
$a + e = +.332$ to $-.026$
$f_3 = +1.156$ $f_1$ is substantially a free variable and need merely to be selected to satisfy Formula 5.

After the parameters in Formulae 1 through 5 have been determined it is necessary to select the proper glass and radii for lens units I, II and III in order to minimize the aberrational change throughout the zoom range for reasons more fully explained hereinafter.

The selection of the proper glass and radii was accomplished by setting the sums of the partial differentials of the third order aberration coefficients equal to some accepted maximum. It is to be noted that the differential of the third order aberration coefficients gives the rate of change of the aberration within the zoom range. By maintaining a rate of change to a relatively low value it is generally possible to maintain the overall change to within accepted limits. It is to be understood, however, that in a few cases notwithstanding the maintenance of the rate of change to a small magnitude the overall change will be greater than can be tolerated so that the change of aberration coefficients must then be set to be equal to or less than some acceptable maximum value.

For a thin lens in air the third order aberration coefficients are as follows:

$$\text{Axial color } A = \frac{y^2 \theta}{V}$$

$$\text{Lateral color } b = \frac{y y_p \theta}{V}$$

Where: V is the Abbe number of the glass and $\theta$ is $1/f$

Spherical aberration G =

$$y^4 \left[ \frac{-\theta^3 n^2}{(n-1)^2} + \frac{\theta^2 c(2n+1)}{(n-1)} - \frac{\theta c^2(n+2)}{n} \right] +$$

$$y^3 u \left[ \frac{-\theta^2(3n+1)}{(n-1)} + \frac{4\theta c(n+1)}{n} \right] - y^2 u^2 \left[ \frac{\theta(3n+2)}{n} \right]$$

Where:

$n$ is the index of refraction of the chosen glass and $c$ is the curvature of the surface toward the incident light or $1/r$ $$\text{Coma } F = \frac{G(y_p)}{y} - y^2 I \left[ \frac{-\theta^2 n}{(n-1)} + \frac{\theta c(n+1)}{n} \right] +$$

$$y u I \left[ \frac{\theta(2n+1)}{n} \right]$$

Where: $I = y_p u - y u_p$ $$\text{Astigmatism } \phi = G \left( \frac{y_p}{y} \right)^2 - y_p p I \left[ \frac{-\theta^2 2n}{(n-1)} + \right.$$

$$\left. \frac{\theta c 2(n+1)}{n} \right] + y_p u I \left[ \frac{2\theta(2n+1)}{n} \right] - I^2 \theta$$

$$\text{Distortion } D = G \left( \frac{y_p}{y} \right)^3 - (y_p)^2 I \left[ \frac{-\theta^2(2n+1)}{(n-1)} + \right.$$

$$\left. \frac{3\theta c(n+1)}{n} \right] + y_p u_p I \left[ \frac{\theta(n+1)}{n} \right] + \frac{p_p^2 u I}{y} \left[ \frac{\theta(3n+2)}{n} \right]$$

As can be seen from FIGURE 3 in the definitions of the parameters all $y$'s and $u$'s refer to principal plane and ray intercepts, which may be calculated by tracing a paraxial rim ray and a maximum principal ray through the zoom system. It can be seen from the following formulae that all $y$'s and $u$'s are functions of the displacement variable $e$:

$$y_{i+1} = y_i - (t \pm e)_{i,\,i+1} (u_i)$$
$$u_{i+1} = y_i \theta_i + u_i$$

Where $\quad \theta_i = 1/f_i$

In order for the quality of the system to remain as consistent as possible the aberrations shown should remain substantially constant throughout the zoom range. Furthermore, the consistency of aberrations is necessary if the relay unit is to correct the residual aberrations throughout the zoom range. Thus, the difference between the value of the aberrations at any point of $e$ within the range of $e_+$ to $e_-$ and the value at some reference point must be equal to or less than some accepted value. As was mentioned previously, the consistency of aberration may generally be obtained by setting the absolute values of the sum of the partial differentials of the respective aberrations for the lens units I, II and III equal to or less than some acceptable value. Thus:

$$(6) \quad \left| d\left[\frac{\sum_I^{III} a}{de}\right] \right| \leq |A_A|$$

$$(7) \quad \left| d\left[\frac{\sum_I^{III} b}{de}\right] \right| \leq |A_b|$$

$$(8) \quad \left| d\left[\frac{\sum_I^{III} G}{de}\right] \right| \leq |A_G|$$

$$(9) \quad \left| d\left[\frac{\sum_I^{III} F}{de}\right] \right| \leq |A_F|$$

$$(10) \quad \left| d\left[\frac{\sum_I^{III} \phi}{de}\right] \right| \leq |A\phi|$$

$$(11) \quad \left| d\left[\frac{1/2I\sum_I^{III} D + \frac{(u_p')^2 - (u_p)^2}{2}}{de}\right] \right| \leq |A_D|$$

Where:
$A_x$ is the acceptable value for the rate of change or change of a particular aberration throughout the zoom range.

The radii, glass, speed and maximum off axis coverage are chosen so that conditions (6) through (11) are fulfilled. Normally the third order equations are sufficient because of the low operating speed of the zoom portion; however, a higher order analysis may be used where desired.

It should be kept in mind that the fact the rate of change or change of the third order aberrations is maintained within limits does not always insure that the aberrations themselves will be within accepted limits. If the residual aberrations exceed accepted limits, they may be corrected by the relay lens unit IV as mentioned previously.

After the parameters of Equations 1 through 5 have been resolved, the deviation of focus may be calculated to determine if it is within accepted limits. The general equation for the deviation of focus caused by the displacement of adjacent lens groups is as follows:

$$\phi = \frac{e^3 - e^2\left[x - a + \frac{f_3^2 x}{ax - f_2^2}\right] - e\left[ax - f_2^2 + \frac{f_3^2(f_2^2 - x^2)}{ax - f_2^2}\right]}{e^2 - e(x-a) - (ax - f_2^2)}$$

It can be seen that the expression for $\phi$ is a rational fraction in which the numerator is of the third order and the denominator of the second order.

In FIGURE 4 there is shown a graphical representation of B in which the point of inflection is arbitrarily chosen as the point of origin with the points of zero focus deviation of full compensation being designated as $e_+$ and $e_-$.
Thus:

$$\phi = \frac{e^3 - pBe^2 - qBe}{e^2 - pe - q}$$

Where:

$$x - a = p$$
$$ax - f_2^2 = q$$
$$B = \left(\frac{\delta\phi}{\delta e}\right) e = 0$$

By calculating the deviation of focus from a given set of values derived for the parameters in Formulae 1 through 5, it can be determined, if it is within acceptable limits. If not, the system may then be scaled until the deviation of focus is within limits. It may be that after scaling, the system is unfeasible with regard to size, speed and the like for the particular use. If that is the case, then the parameters in Formulae 1 through 5 may be recalculated until such a system with an acceptable deviation of focus or size is found. It is to be understood that acceptable limits of deviation of focus and size will vary with each particular type of use so that which is acceptable for one use may be unacceptable for another and vice versa.

Referring now to FIGURES 5, 10 and 14, there are shown three examples of a variable focal length lens system embodying the invention. In each of these examples the lens system is composed of a zoom portion consisting of lens units I, II and III in which units I and III are fixed relative to each other and are movable with respect to unit II. The systems further include a lens unit IV which is a relay used for correcting aberrational residuals and magnifying the image formed by the zoom portion.

The mechanical construction (not shown) for supporting the lens units may be of a conventional design. For example, the movable units may be motivated by any suitable means, such as rack and pinion gearing, linear cams and the like, which are adapted to provide linear motion.

In the following tables there is set forth the constructional data of the lens system shown in FIGURES 5, 10 and 14. The lens units have been numerically designated in the order in which the light is encountered. The radii, thicknesses and spaces have been numbered according to the order in which they occurred from left to right in the conventional manner. In the tables the symbols R, t, and S are the radii, thicknesses and spaces, respectively, and the symbols $N_D$ and V are the index of refraction in sodium D light and the reciprocal dispersion ratio (Abbe number), respectively.

The variable focal length system shown in FIGURE 5 is as follows:

*Table 1*

[8 mm. projection lens 15 to 25 E.F.L. at $f/1.6$]

| Lens Unit | Radii | Thicknesses (t) Spaces (S) | $N_D$ | V |
|---|---|---|---|---|
| I | $R_1 = 18.265$ | $t_1 = 2.54$ | 1.517 | 64.5 |
|   | $R_2 = 36.061$ | $S_1 = 3.429$ to $12.446$ | | |
| II | $R_3 = -19.057$ | $t_2 = 1.016$ | 1.529 | 51.6 |
|   | $R_4 = 36.132$ | $S_2 = 10.673$ to $1.656$ | | |
| III | $R_5 = 36.633$ | $t_3 = 2.54$ | 1.620 | 60.3 |
|   | $R_6 = -30.266$ | $S_3 = 1.509$ to $10.526$ | | |
| IV | $R_7 = 16.635$ | $t_4 = 3.302$ | 1.620 | 60.3 |
|   | $R_8 = -29.667$ | $S_4 = .311$ | | |
|   | $R_9 = -16.795$ | $t_5 = 1.016$ | 1.689 | 30.9 |
|   | $R_{10} = +22.527$ | $S_5 = 0$ | | |
|   | $R_{11} = +22.527$ | $t_6 = 3.302$ | 1.620 | 60.3 |
|   | $R_{12} = -20.701$ | $S_6 = 13.015$* | | |

*This is a nominal value for the back focal length which varies slightly as explained previously.

The variable focal length system shown in FIGURE 10 is as follows:

*Table II*

[8 mm. projection lens 15 to 25 E.F.L. at f/1.2]

| Lens Unit | Radii | Thicknesses (t) Spaces (S) | $N_D$ | V |
|---|---|---|---|---|
| I | $R_1 = 24.33$ | $t_1 = 3.21$ | 1.517 | 64.5 |
|   | $R_2 = 50.00$ | $S_1 = 7.50$ to $18.93$ | | |
| II | $R_3 = -24.09$ | $t_2 = 1.28$ | 1.529 | 51.6 |
|    | $R_4 = 45.68$ | $S_2 = 12.83$ to $1.40$ | | |
| III | $R_5 = 46.31$ | $t_3 = 3.21$ | 1.620 | 60.3 |
|     | $R_6 = -38.26$ | $S_3 = .96$ to $12.39$ | | |
| IV | $R_7 = 15.44$ | $t_4\ 2.84$ | 1.651 | 55.8 |
|    | $R_8 = 72.98$ | $S_4 = .12$ | | |
|    | $R_9 = 16.79$ | $t_5 = 3.79$ | 1.511 | 63.5 |
|    | $R_{10} = -16.79$ | $S_5 = 0$ | | |
|    | $R_{11} = -16.79$ | $t_6 = 2.37$ | 1.689 | 30.9 |
|    | $R_{12} = 10.99$ | $S_6 = 1.90$ | | |
|    | $R_{13} = 17.08$ | $t_7\ 5.21$ | 1.651 | 55.8 |
|    | $R_{14} = -30.10$ | $S_7 = 6.858$* | | |

* This is a nominal value for the back focal length which varies slightly as explained previously.

The variable focal length system shown in FIGURE 14 is as follows:

*Table III*

[8 mm. projection lens 15 to 25 E.F.L. at f/1.6]

| Lens Unit | Radii | Thicknesses (t) Spaces (S) | $N_D$ | V |
|---|---|---|---|---|
| I | $R_1 = 19.25$ | $t_1 = 2.54$ | 1.517 | 64.5 |
|   | $R_2 = 39.55$ | $S_1 = 5.29$ to $14.56$ | | |
| II | $R_3 = -19.06$ | $t_2 = 1.02$ | 1.529 | 51.6 |
|    | $R_4 = 36.13$ | $S_2 = 10.43$ to $1.16$ | | |
| III | $R_5 = 36.63$ | $t_3 = 2.54$ | 1.620 | 60.3 |
|     | $R_6 = -30.27$ | $S_3 = 3.66$ to $12.93$ | | |
| IV | $R_7 = 14.10$ | $t_4 = 4.0$ | 1.620 | 60.3 |
|    | $R_8 = -10.60$ | $S_4 = 0$ | | |
|    | $R_9 = -10.60$ | $t_5 = 6.00$ | 1.720 | 29.3 |
|    | $R_{10} = -67.40$ | $S_5 = 10.834$* | | |

* This is a nominal value for the back focal length which varies slightly as explained previously.

It is to be noted that the relay portion of the lens system (lens unit IV) shown in FIGURES 5, 10 and 14 are merely for exemplary purposes in that other lens constructions may be used to accomplish the same results. For that reason the lens unit IV in each of the systems is not to be considered as a limitation. Furthermore, in some instances the residual aberrations of the zoom portion may be sufficiently small in magnitude for the particular use to eliminate the necessity of a relay lens, as was mentioned previously.

Although certain specific embodiments of the invention are disclosed herein, it is to be understood that these are merely by way of example and in no manner to be considered as limitations. It will be apparent that such modifications may be made within the scope of the claims without departing from the spirit of the invention.

I claim:

1. A variable focal length lens system comprising first, second and third lens units in which said first and third lens units are rigidly coupled and are movable with respect to said second lens unit and in which the constructional data of said lens system is as follows:

| Lens Unit | Radii | Thicknesses (t) Spaces (S) | $N_D$ | V |
|---|---|---|---|---|
| I | $R_1 = 19.25$ | $t_1 = 2.54$ | 1.517 | 64.5 |
|   | $R_2 = 39.55$ | $S_1 = 5.29$ to $14.56$ | | |
| II | $R_3 = -19.06$ | $t_2 = 1.02$ | 1.529 | 51.6 |
|    | $R_4 = 36.13$ | $S_2 = 10.43$ to $1.16$ | | |
| III | $R_5 = 36.63$ | $t_3 = 2.54$ | 1.620 | 60.3 |
|     | $R_6 = -30.27$ | | | | wherein R, t and S are the radii, thicknesses and spaces, respectively, and $N_D$ and V are the index of refraction in sodium D light and the reciprocal dispersion ratio, respectively.

2. A variable focal length lens system comprising first, second and third lens units in which said first and third lens units are rigidly coupled and are movable with respect to said second lens unit and in which the constructional data of said lens system is as follows:

| Lens Unit | Radii | Thicknesses (t) Spaces (S) | $N_D$ | V |
|---|---|---|---|---|
| I | $R_1 = 24.33$ | $t_1 = 3.21$ | 1.517 | 64.5 |
|   | $R_2 = 50.00$ | $S_1 = 7.50$ to $18.93$ | | |
| II | $R_3 = -24.09$ | $t_2 = 1.28$ | 1.529 | 51.6 |
|    | $R_4 = 45.68$ | $S_2 = 12.83$ to $1.40$ | | |
| III | $R_5 = 46.31$ | $t_3 = 3.21$ | 1.620 | 60.3 |
|     | $R_6 = -38.26$ | | | | wherein R, t and S are the radii, thicknesses and spaces, respectively, and $N_D$ and V are the index of refraction in sodium D light and the reciprocal dispersion ratio, respectively.

3. A variable focal length lens system comprising first, second and third lens units in which said first and third lens units are rigidly coupled and are movable with respect to said second lens unit and in which the constructional data of said lens system is as follows:

| Lens Unit | Radii | Thicknesseses (t) Spaces (S) | $N_D$ | V |
|---|---|---|---|---|
| I | $R_1 = 18.265$ | $t_1 = 2.54$ | 1.517 | 64.5 |
|   | $R_2 = 36.061$ | $S_1 = 3.429$ to $12.446$ | | |
| II | $R_3 = -19.057$ | $t_2 = 1.016$ | 1.529 | 51.6 |
|    | $R_4 = 36.132$ | $S_2 = 10.673$ to $1.656$ | | |
| III | $R_5 = 36.633$ | $t_3 = 2.54$ | 1.620 | 60.3 |
|     | $R_6 = -30.266$ | | | | wherein R, t and S are the radii, thicknesses and spaces, respectively, and $N_D$ and V are the index of refraction in sodium D light and the reciprocal dispersion ratio, respectively.

4. A variable focal length lens system comprising first, second and third lens units in which said first and third lens units are rigidly coupled and are movable with respect to said second lens unit and in which the constructional data of said lens system is as follows:

| Lens Unit | Radii | Thicknesses (t) Spaces (S) | $N_D$ | V |
|---|---|---|---|---|
| I | $R_1=19.25$ $R_2=39.55$ | $t_1=2.54$ $S_1=5.29$ to $14.56$ | 1.517 | 64.5 |
| II | $R_3=-19.06$ $R_4=36.13$ | $t_2=1.02$ $S_2=10.43$ to $1.16$ | 1.529 | 51.6 |
| III | $R_5=36.63$ $R_6=-30.27$ | $t_3=2.54$ $S_3=3.66$ to $12.93$ | 1.620 | 60.3 |
| IV | $R_7=14.10$ $R_8=-10.60$ $R_9=-10.60$ $R_{10}=-67.4$ | $t_4=4.00$ $S_4=0$ $t_5=6.00$ $S_5=10.834$ (Nominal) | 1.620 1.720 | 60.3 29.3 | wherein R, t and S are the radii, thicknesses and spaces, respectively, and $N_D$ and V are the index of refraction in sodium D light and the reciprocal dispersion ratio, respectively.

5. A variable focal length lens system comprising first, second and third lens units in which said first and third lens units are rigidly coupled and are movable with respect to said second lens unit and in which the constructional data of said lens system is as follows:

| Lens Unit | Radii | Thicknesses (t) Spaces (S) | $N_D$ | V |
|---|---|---|---|---|
| I | $R_1=24.33$ $R_2=50.00$ | $t_1=3.21$ $S_1=7.50$ to $18.93$ | 1.517 | 64.5 |
| II | $R_3=-24.09$ $R_4=45.68$ | $t_2=1.28$ $S_2=12.83$ to $1.40$ | 1.529 | 51.6 |
| III | $R_5=46.31$ $R_6=-38.26$ | $t_3=3.21$ $S_3=.96$ to $12.39$ | 1.620 | 60.3 |
| IV | $R_7=15.44$ $R_8=72.98$ $R_9=16.79$ $R_{10}=-16.79$ $R_{11}=-16.79$ $R_{12}=10.99$ $R_{13}=17.08$ $R_{14}=30.10$ | $t_4=2.84$ $S_4=.12$ $t_5=3.79$ $S_5=0$ $t_6=2.37$ $S_6=1.90$ $t_7=5.21$ $S_7=6.859$ (Nominal) | 1.651 1.511 1.689 1.651 | 55.8 63.5 30.9 55.8 | wherein R, t and S are the radii, thicknesses and spaces, respectively, and $N_D$ and V are the index of refraction in sodium D light and the reciprocal dispersion ratio, respectively.

6. A variable focal length lens system comprising first, second and third lens units in which said first and third lens units are rigidly coupled and are movable with respect to said second lens unit and in which the constructional data of said lens system is as follows:

| Lens Unit | Radii | Thicknesses (t) Spaces (S) | $N_D$ | V |
|---|---|---|---|---|
| I | $R_1=18.265$ $R_2=36.061$ | $t_1=2.54$ $S_1=3.429$ to $12.446$ | 1.517 | 64.5 |
| II | $R_3=-19.057$ $R_4=36.132$ | $t_2=1.016$ $S_2=10.673$ to $1.656$ | 1.529 | 51.6 |
| III | $R_5=36.633$ $R_6=-30.266$ | $t_3=2.54$ $S_3=1.509$ to $10.526$ | 1.620 | 60.3 |
| IV | $R_7=16.635$ $R_8=-29.667$ $R_9=-16.792$ $R_{10}=22.527$ $R_{11}=22.527$ $R_{12}=-20.701$ | $t_4=3.302$ $S_4=.311$ $t_5=1.016$ $S_5=0$ $t_6=3.302$ $S_6=13.015$ | 1.620 1.689 1.620 | 60.3 30.9 60.3 | wherein R, t and S are the radii, thicknesses and spaces, respectively, and $N_D$ and V are the index of refraction in sodium D light and the reciprocal dispersion ratio, respectively.

References Cited by the Examiner

UNITED STATES PATENTS 2,983,194   5/61   Miles ------------------ 88—57
3,000,260   9/61   Turula et al. ------------ 88—57

OTHER REFERENCES

Back et al., The Basic Theory of Varifocal Lenses With Linear Movement and Optical Compensation, Journal of the Optical Society of America, vol. 44, No. 9, pages 684–691, September 1954.

JEWELL H. PEDERSEN, *Primary Examiner.*

WILLIAM MISIEK, *Examiner.*

UNITED STATES PATENT OFFICE
CERTIFICATE OF CORRECTION

Patent No. 3,216,319             November 9, 1965

James E. Thurow

It is hereby certified that error appears in the above numbered patent requiring correction and that the said Letters Patent should read as corrected below.

Column 1, line 19, for "are" read -- art --; column 4, lines 47 to 49, for that portion of the formula reading $$-y_p pI \qquad \text{read} \qquad -y_p yI$$

column 7, Table II, third column, line 13 thereof, for "$t_7$ 5.21" read -- $t_7 = 5.21$ --.

Signed and sealed this 13th day of September 1966.

(SEAL)
Attest:

ERNEST W. SWIDER             EDWARD J. BRENNE
Attesting Officer             Commissioner of Patents